US005173894A

United States Patent [19]

Kido

[11] Patent Number: 5,173,894
[45] Date of Patent: Dec. 22, 1992

[54] AUTOMATIC DISC LOADING AND CENTERING APPARATUS

[75] Inventor: Kunio Kido, Tokyo, Japan

[73] Assignee: Tanashin Denki Co., Ltd., Tokyo, Japan

[21] Appl. No.: 547,972

[22] Filed: Jul. 3, 1990

[30] Foreign Application Priority Data

Jul. 15, 1989 [KR] Rep. of Korea .............. 89-10416[U]

[51] Int. Cl.⁵ .............................................. G11B 17/04
[52] U.S. Cl. .................................. 369/77.1; 369/75.2; 360/99.06
[58] Field of Search ........................ 369/34, 35, 36, 38, 369/39, 77.1, 77.2, 75.2, 270; 360/99.02, 99.03, 99.06, 369

[56] References Cited

U.S. PATENT DOCUMENTS

| 4,542,426 | 9/1985 | Wilkinson, Jr. et al. | |
| 4,580,256 | 4/1986 | Inaba et al. | 369/77.1 |
| 4,627,042 | 12/1986 | Hara | 369/77.1 |
| 4,663,677 | 5/1987 | Griffith et al. | |
| 4,674,079 | 6/1987 | Agostini | 369/77.1 |
| 5,022,023 | 6/1991 | Toyoguchi | 369/77.1 |
| 5,031,169 | 7/1991 | Kato et al. | 369/270 X |
| 5,031,171 | 7/1991 | Kurumada et al. | 369/77.1 X |

FOREIGN PATENT DOCUMENTS

| 64-8545 | 1/1989 | Japan . | |
| 2120831A | 12/1983 | United Kingdom . | |
| 2135811 | 9/1984 | United Kingdom | 369/270 |

Primary Examiner—Stuart S. Levy
Assistant Examiner—Joseph A. Rhoa
Attorney, Agent, or Firm—Vidas & Arrett

[57] ABSTRACT

A disk type record medium lodging apparatus includes a body, a pair of record medium size detecting members (8), a pair of stoppers (15), a pair of gearing mechanisms, and a separating unit. The introducing positon of the disk type record medium having a small outer diameter through the slit entrance is not limited, and the exactness on according the centers between the turntable and the disk type record medium having a small outer diameter is improved with simple construction.

3 Claims, 9 Drawing Sheets

AUTOMATIC DISC LOADING AND CENTERING APPARATUS

BACKGROUND OF THE INVENTION

1. Field of the Invention

The present invention relates to a disk type record medium lodging apparatus in which disk type record media having different outer diameters are inserted by a carrier or natural falling from an entrance and stopped in the concentric position with a turntable of the reproduction apparatus.

2. Description of the Prior Art

A disk type record medium lodging apparatus is well-known in the prior art, for example, Japanese Patent Laid-Open No. 64-8545, in which the disk type record medium having different outer diameters are inserted by a carrier from an entrance and stopped in the concentric position with a turntable of the reproduction apparatus.

In such a conventional apparatus, the entrance to insert the record medium is in accord with a disk type record medium having a large outer diameter. Because a guide is mounted to prevent a disk type record medium having a small outer diameter from being inserted from off-center positions of the entrance, inserting positions of a disk type record medium having a small outer diameter are limited against the entrance.

Further, the conventional lodging apparatus has the drawback of a complicated structure because it includes a switch to detect arrival of the disk type record medium inserted from the entrance in the concentric position with the turntable so as to stop the disk type record medium in a given position.

The conventional lodging apparatus has a further drawback of low exactness in aligning the center of the turntable with the center of the disk type record medium having a small outer diameter because a stopper thereof exists nearly opposite the position where the medium is vertically inserted by natural falling with removing a carrier.

SUMMARY OF THE INVENTION

It is a general object of the invention to provide a disk type record medium lodging apparatus which avoids a limitation of inserting positions of the disk type record medium having a small outer diameter against the entrance, has a simple construction, and improves the exactness to align the center of the turntable with that of the disk type record medium having a small outer diameter.

In order to achieve the object of the invention, the invention resides in a disk type record medium lodging apparatus including a body having a slit entrance to uprightly introduce disk type record media having different diameters; a pair of record medium size detecting members mounted on the left and right sides of said body, each of which has variable distance from a given record medium lodging position center in a given range, and is biased toward said record medium lodging position center; and a pair of stoppers which are mounted respectively on the left and right sides of said body, each of which is positioned below the position of said record medium size detecting members and said record medium lodging position center, has variable position from said record medium lodging position center in a given range, and said pair of stoppers regulating said disk type record medium having the smallest diameter to be exactly positioned on a given record medium lodging position center when positioned nearest to said record medium lodging position center, characterized by comprising a pair of gearing mechanisms by which the right side record medium size detecting member is coupled with the left side stopper and the left side record medium size detecting member is coupled with the right side stopper; and a separating unit which separates each of the record medium size detecting members and the stoppers from the disk type record medium according to a given reproduction preparing operation, wherein the position relations between the same side record medium size detecting member and the stopper are defined such that the distance therebetween in the plane of introduction of said record media which is perpendicular to the introducing direction of the record media is shorter than the radius of the disk type record medium having the smallest radius when the record medium size detecting member is positioned the farthest away from the record medium lodging position center and said stopper is positioned the nearest to said record medium lodging position center.

In accordance with one aspect of the invention, where the disk type record medium is inserted from the entrance, a right side record medium size detecting member is linked with a left side stopper, and at the same time a left side record medium size detecting member is linked with a right side stopper. Furthermore, where the disk type record medium stops at the center of the lodging position, each pair of the record medium size detecting member and the stopper is released from the record medium in accordance with the linked movement with a given operation for preparing reproduction.

BRIEF DESCRIPTION OF THE DRAWINGS

The preferred embodiments of the invention will now be described, by way of example, with reference to the accompanying drawings in which.

DETAILED DESCRIPTION OF THE INVENTION

Figure 1:
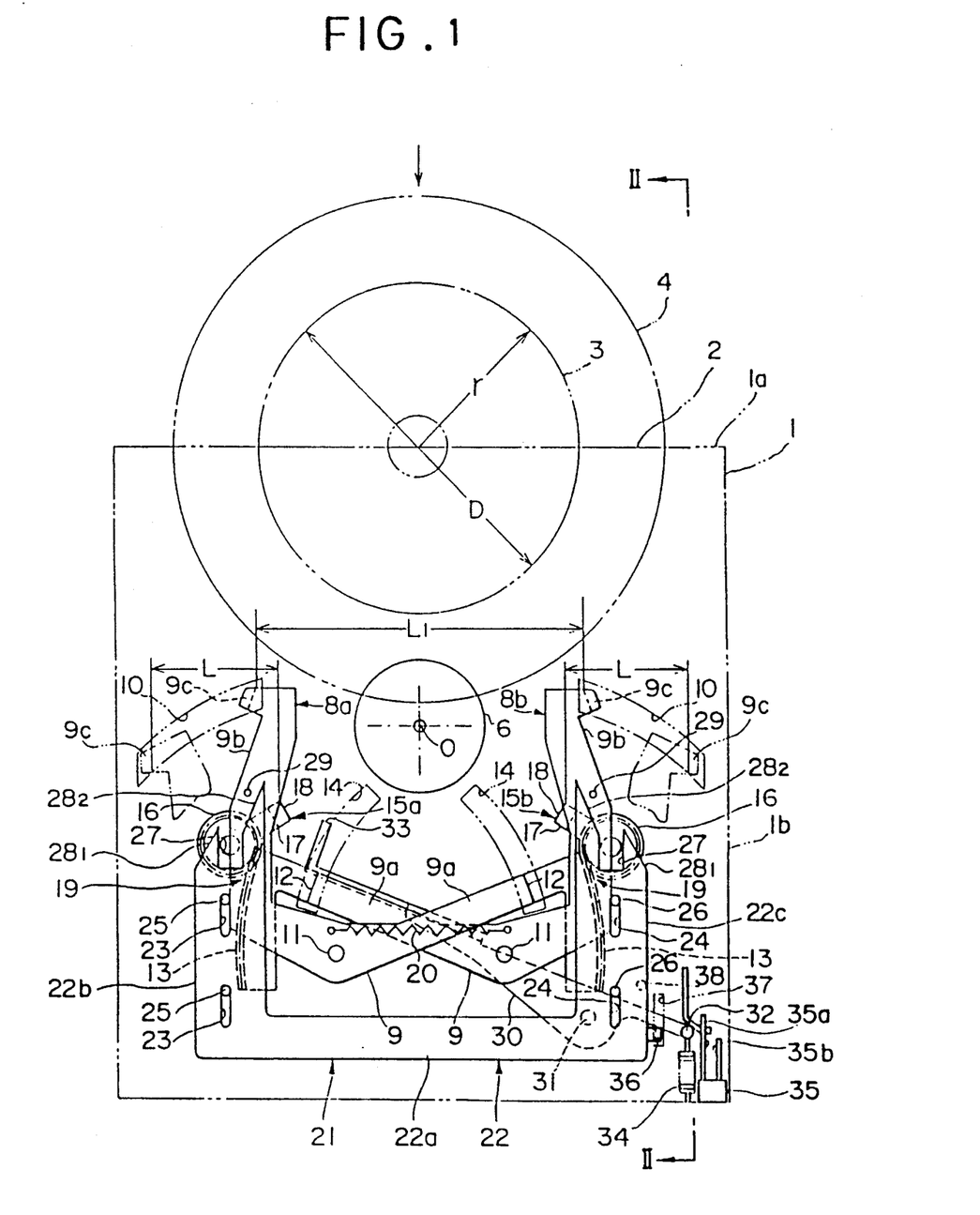
FIG. 1 is a front elevational view of the disk type record medium lodging apparatus according to the invention.
Figure 2:
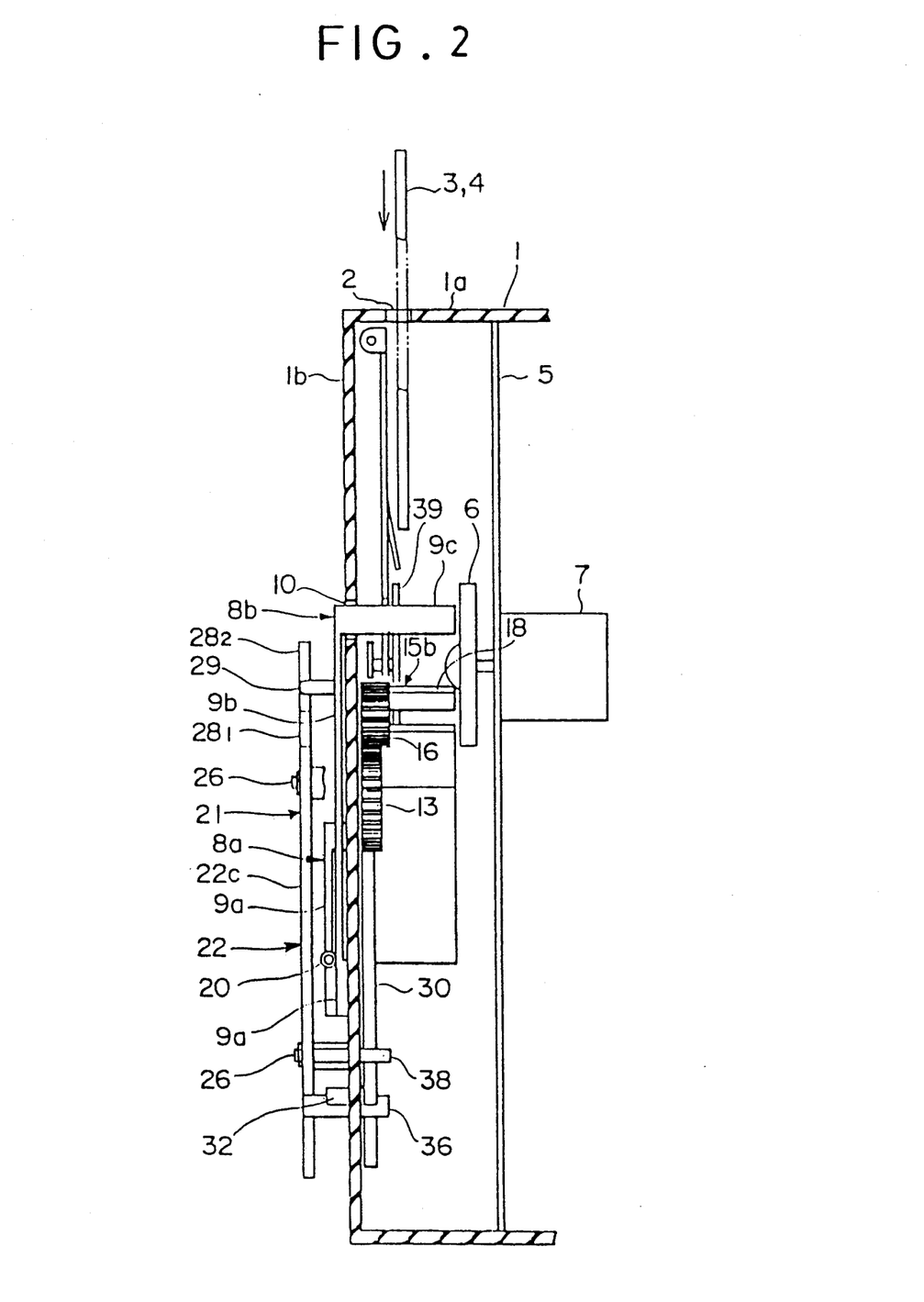
FIG. 2 is a sectional view taken along the line II—II of FIG. 1.

FIG. 1 is a front elevational view of the disk type record medium lodging apparatus according to the invention, and FIG. 2 is a sectional view taken along the line II—II of FIG. 1. There is shown a body 1 like a thin rectangular box in both Figures.

The body 1 includes a slit entrance 2 on a upper wall 1a of the body 1. Several kinds of the disk type record media 3 and 4 having different diameters such as 8 cm and 12 cm are able to enter through the slit entrance 2 in the direction of diameters (arrows in the Figures).

A base plate 5 is mounted in parallel with a front wall 1b in the body 1. A turntable 6 of a reproduction apparatus (not shown) is mounted on the front center portion of the base plate 5 and rotated by a motor 7. The center of the turntable 6 becomes the lodging position center O of the record medium.

A pair of record medium size detecting members 8a and 8b are mounted in both sides on outer surface of the front wall 1b of the body 1. These record medium size detecting members 8a and 8b have the same construction and include a main portion 9 which comprises an approximately horizontal one side 9a and an approximately vertical other side 9b sequentially mounted on each other. A projecting wall 9c is integrally mounted on the front end of the other side 9b toward the front wall 1b of the body 1 and extended to the inner side of the body 1 so as to be moved in the arc shaped long hole 10 penetrated through the front wall 1b of the body 1. The outer surface of the disk type record media 3 and 4 inserted from the slit entrance 2 contacts the projecting wall 9c.

The pair of the record medium size detecting members 8a and 8b are positioned outside of the front wall 1b of the body 1, and downward from the center of the turntable 6 which is the record medium lodging position center O. The size detecting members 8a and 8b are rotatably attached to the front wall 1b of the body 1 by rotatably engaging approximately center position of the one side 9a with a shaft 11. As a result, the main portion 9 is rotated on the shaft 11 so that the distance from a given record medium lodging position center O of the projecting wall 9c is variable in a given range.

The pair of record medium size detecting members 8a and 8b are biased by the spring 20 in the direction which the projecting wall 9c approaches to the record medium lodging position center O. The one end of the spring 20 is secured to the surface of the one side 9a in the main portion 9 of the left side record medium size detecting member 8a, and the other end thereof to the surface of the other side 9b in the main portion 9 of the right side record medium size detecting member 8b. A fan-shaped gear 13 is integrally mounted on the other side of the main portion 9 of record medium size detecting members 8a and 8b through a step portion 12 descending to the front wall 1b of the body and inwardly extended to the body 1 movably through the arc-shaped second long hole 14 mounted on the front wall 1b of the body 1.

Mounted on the inner surface of the front wall 1b of the body 1 are a pair of stoppers 15a and 15b positioned below (downward in the Figure) the projecting wall 9c of the record medium size detecting members 8a and 8b and the record medium lodging position center O. These stoppers 15a and 15b have the same construction and include a radially projecting element 17 mounted on a circumferential portion of the spur gear 16 rotatably engaged to the inner surface of the front wall 1b of the body 1 and a contacting element 18 projectingly mounted on the projecting end of the element 17 toward the base plate 5.

As the contacting element 18 is integrally rotated together with the spur gear 16, the relative position of the contacting element 18 to the record medium lodging position center O is able to change in a given range. Accordingly, where the contacting element 18 is positioned nearest to the record medium lodging position center O, the outer circumference of the disk type record medium 3 having the smallest diameter contacts the element 18 so as to be exactly positioned on a given record medium lodging position center O. The spur gear 16 of the left side stopper 15a is engaged with the fan-shaped gear 13 of the right side record medium size detecting member 8b, and the spur gear 16 of the right side stopper 15b is engaged with the fan-shaped gear 13 of the left side record medium size detecting member 8a. As a result, the left side stopper 15a and the right side record medium size detecting member 8b are linked with each other by the gearing mechanism 19 comprising the spur gear 16 and the fan-shaped gear 13, and the right side stopper 15b and the left side record medium size detecting member 8b are linked with each other by the gearing mechanism 19 comprising the spur gear 16 and the fan-shaped gear 13.

The position relations between the same side record medium size detecting member and the stopper 8a and 15a (or 8b and 15b) will now be described. A distance L perpendicular to the introducing direction of the record media in the plane of introduction of the record media is set to be shorter than the radius r of the disk type record medium 3 having the smallest radius under the conditions that the record medium size detecting member 8a or 8b is positioned the farthest away from the record medium lodging position center O, and the stopper 15a or 15b is positioned the nearest to the record medium lodging position center O (Shown in FIG. 1). A distance L1 between the two projecting walls 9c is set to be slightly longer than the diameter D of the disk type record medium 3 having the smallest radius under the condition that a pair of record medium size detecting members 8a and 8b are positioned the nearest to the record medium lodging position center O (also shown in FIG. 1).

A separating unit 21 is mounted on the outer surface of the front wall 1b of the body 1 and positioned further outward from the record medium size detecting members 8a and 8b. The separating unit 21 separates both the pair of projecting walls 9c of the record medium size detecting members 8a and 8b and the pair of contacting elements 18 of the stoppers 15a and 15b from the disk type record medium 3 or 4 according to the reproduction preparing operation of the reproduction preparing apparatus (not shown). The separating unit 21 includes "⊏" shaped body 22 comprising a middle plate 22a and a pair of side plates 22b and 22c integrally and vertically formed on both ends of the middle plate 22a. The pair of side plates 22b and 22c of the body 22 includes a pair of long holes 23 and 24 which slidably engage pins 25 and 26 projected on the outer surface of the front wall 1b of the body 1, thereby permitting movement of the body 22 upwardly or downwardly on the outer surface of the front wall 1b.

A pair of recesses 27 are formed on the upper ends of the side plates 22b and 22c of the body 22. First and second slopes $28_1$ and $28_2$ are formed on the side edges of the recesses 27 of the side plates 22b and 22c. When the body 22 moves upwardly, these first and second slopes $28_1$ and $28_2$ contact and engage the pin 29 projected on the outer surface of the other side 9b of the main portion 9 of both record medium size detecting members 8a and 8b, and then record medium size detecting members 8a and 8b are respectively compelled to rotate in the direction which moves projecting wall 9c away from the record medium lodging position center O.

Mounted on the inner surface of the front wall 1b of the body 1 is a trigger 30 which is supported by a shaft 31 to rotate. One end of the trigger 30 includes a switch operating unit 32, the other end thereof includes a contacting portion 33. As shown in FIG. 1, the trigger 30 is always biased clockwise (that is, in the direction which the contacting portion 33 gets near to the record medium lodging position center O) by the spring 34. When the outer circumference of a disk type record medium 3 or 4 introduced from the slit entrance 2 contacts the contacting portion 33 of the trigger 30, the trigger 30 rotates counterclockwise in FIG. 1 so as to turn switch 35 of the reproduction preparing apparatus ON.

The switch 35 is a normally opened switch mounted on the body 1, and includes a pair of contacts 35a and 35b. Where the trigger 30 rotates counterclockwise against the resilient force of the spring 34, the operating unit 32 is pressing contacts 35a. Consequently, the contacts 35a rotate and contact to the other contacts 35b against the resilient force itself so as to turn switch 35 ON.

The maximum clockwise rotation of the trigger 30 is regulated by the first stopper 36 projected toward the front wall 1b of the body 1 on the lower and outer edge of the side plate 22c of the body 22 of the separating unit 21. The first stopper 36 extends inward of the body 1 movably through the long hole 37 mounted on the front wall 1b of the body 1. On the other hand, the maximum counterclockwise rotation of the trigger 30 is regulated by the second stopper 38 projected toward the front wall 1b of the body 1 on upper and near portion of the first stopper 36 and in the side plate 22c. The second stopper 38 extends inward of the body 1 movably through a long hole (not shown) mounted on the front wall 1b of the body 1.

In FIG. 2, there is shown a clamper 39 which clamps the disk type record medium 3 or 4 to the turntable 6.

Figure 3:
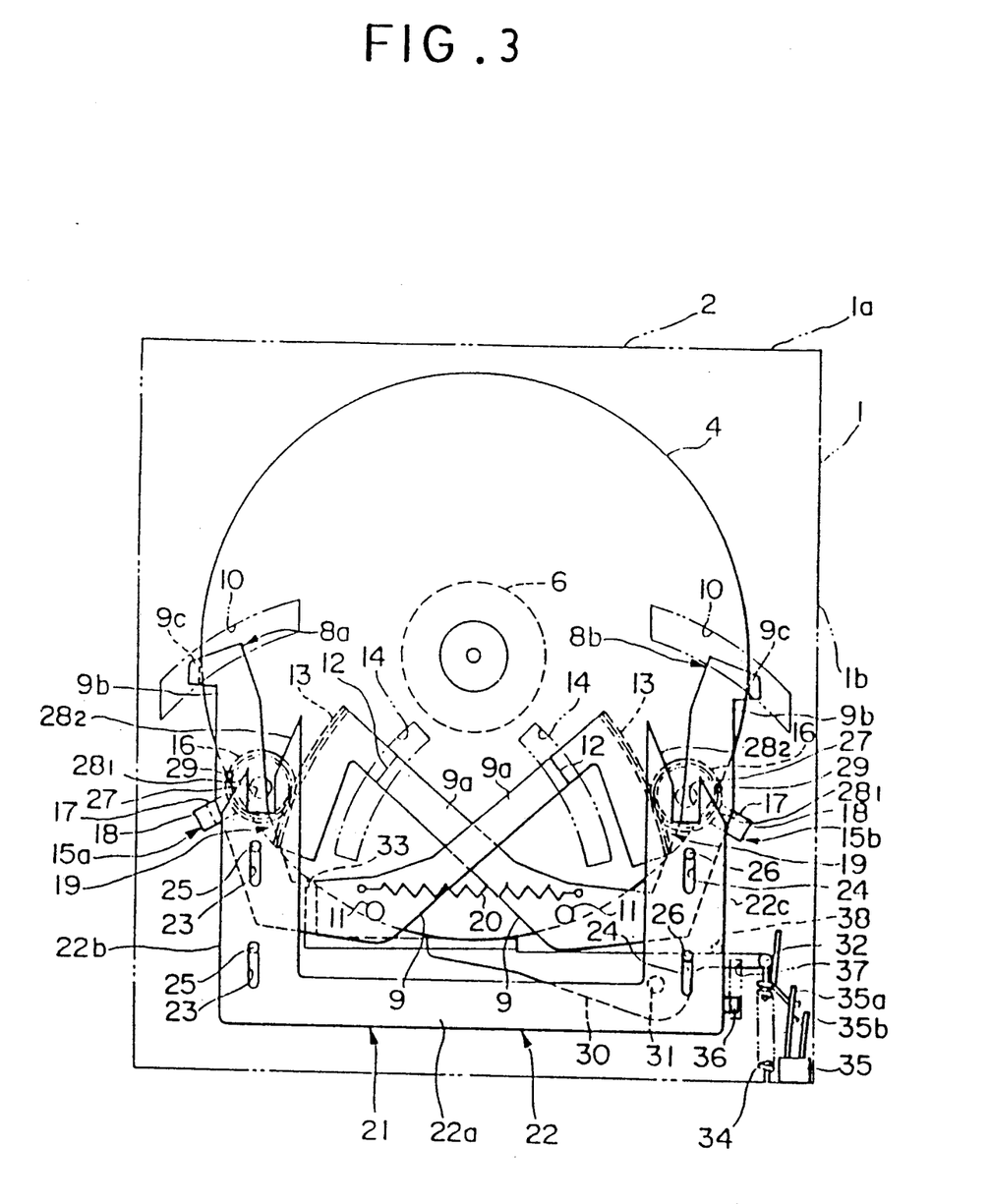
FIG. 3 and FIG. 4 are views for explaining the movement of the disk type record medium lodging apparatus of FIG. 1, when inserting a disk type record medium having a large outer diameter.

The operation of the disk type record medium lodging apparatus will now be described. FIG. 1 shows a state in which the disk type record medium 3 or 4 is not lodged. In this state, when a disk type record medium 4 having a large outer diameter (for example, 12 cm) is inserted by way of the entrance 2 of the upper wall 1a of the body 1, the outer circumference of the disk type record medium 4 contacts the projecting walls 9c of both record medium size detecting members 8a and 8b. With further pressing of the disk type record medium 4 inward into inward of the body 1 (downward in Figures), the left and right side record medium size detecting members 8a and 8b rotate counterclockwise and clockwise, respectively, against the resilient force of the spring 20. The rotation of record medium size detecting members 8a and 8b causes the left side stopper 15a to rotate counterclockwise and the right side stopper 15b to rotate clockwise, respectively. When the disk type record medium 4 is completely inserted through the entrance 2, the center of the disk type record medium 4 is surely aligned with the record medium lodging position center O. At the same time, the outer circumference of the disk type record medium 4 contacts the contacting portion 33 of the trigger 30 so that the trigger 30 rotates counterclockwise against the resilient force of the spring 34 so as to turn the switch 35 ON. As shown in FIG. 3, when the disk 4 is aligned with the record medium lodging position center O, further counterclockwise rotation of trigger 30 is stopped by stopper 38 so that further insertion of the disk 4 is prevented by the contacting surface 33 of trigger 30. Finally, the reproduction preparing apparatus operates to start reproduction preparing operations (See FIG. 3).

Figure 4:
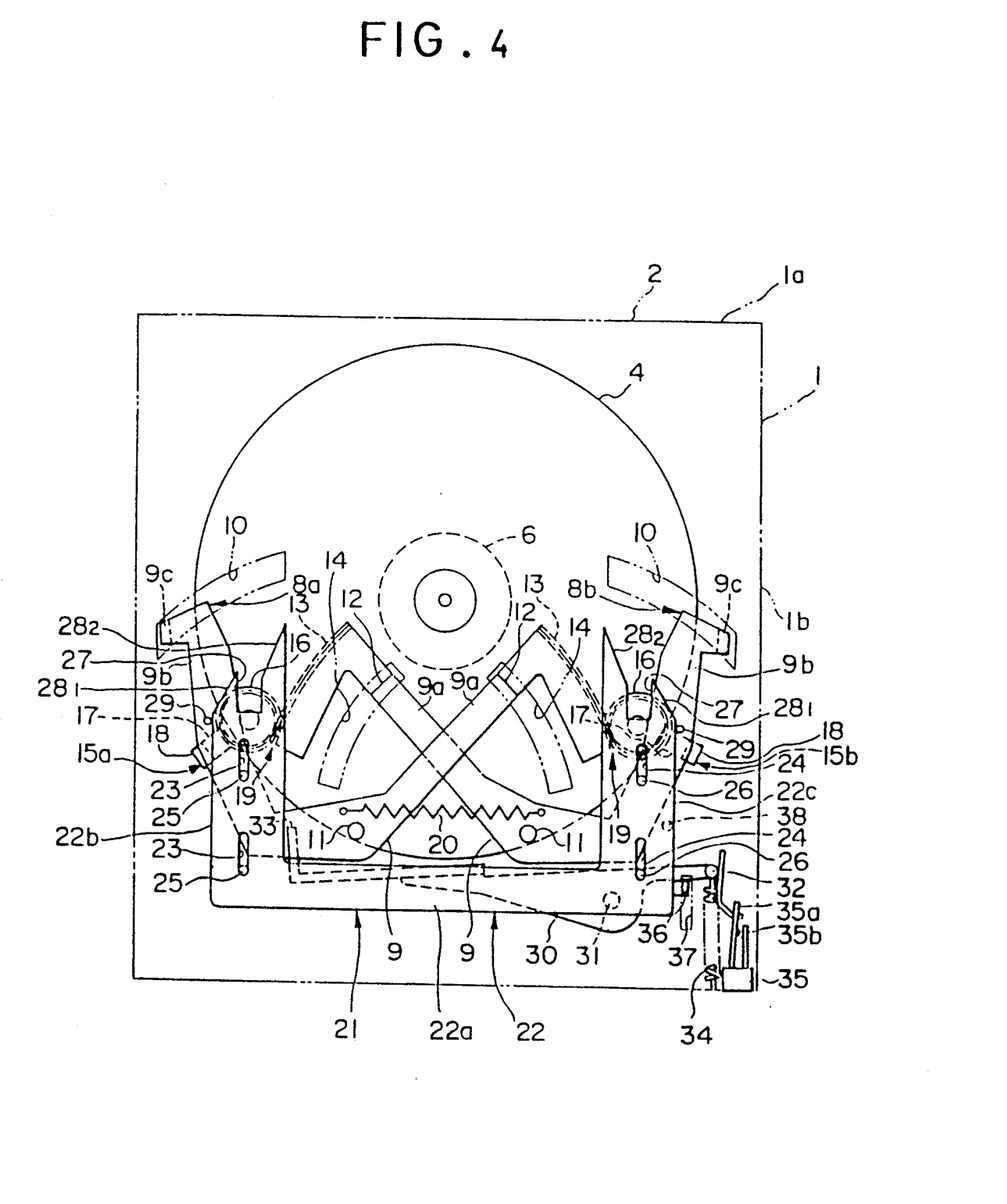

Following the reproduction preparing operations the body 22 of the separating unit 21 moves upwardly. Upon contacting the first slope 28₁ of side plates 22b and 22c to the pins 29 of record medium size detecting members 8a and 8b, the members 8a and 8b rotate against the resilient force of the spring 20 so that the projecting wall 9c is separated from the outer circumference of the disk type record medium 4. Since the body 22 of the separating unit 21 moves upwardly and the first stopper 36 mounted on the body 22 contacts the trigger 30, the trigger 30 rotates counterclockwise in the Figures so that the contacting portion is separated from the outer circumference of the disk type record medium 4. Under the condition that the center of the disk type record medium 4 is aligned with the record medium lodging position center O, the clamper 39 presses the turntable 6 so that the disk type record medium 4 is integrally rotated with the turntable 6 so as to make reproduction (See FIG. 4).

Figure 5:
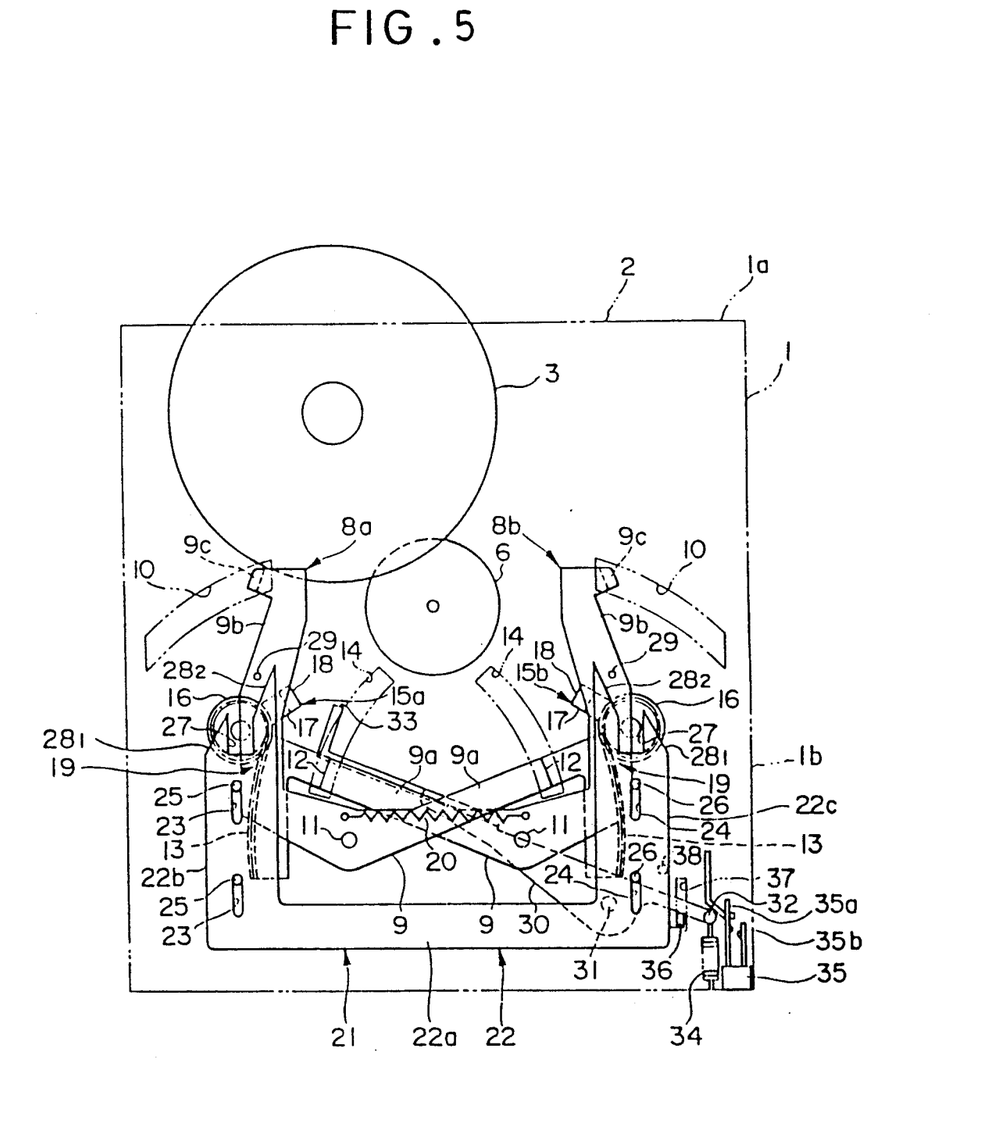
FIG. 5 through FIG. 9 are views for explaining the movement of the disk type record medium lodging apparatus of FIG. 1, when inserting a disk type record medium having a small outer diameter.

When a disk type record medium 3 having a small diameter, e.g. 8 cm is introduced by the slit entrance 2 of the upper wall 1a of the body 1 as shown in FIG. 5, the disk type record medium 3 contacts the projecting wall 9c of one (e.g. left side) of the record medium size detecting member 8a. When the disk type record medium 3 is further introduced into the inner portion (downward in Figures) of the body 1, the left side record medium size detecting member 8a rotates counterclockwise against the resilient force of the spring 20 so that the right side stopper 15b rotates clockwise in the Figures.

Figure 6:
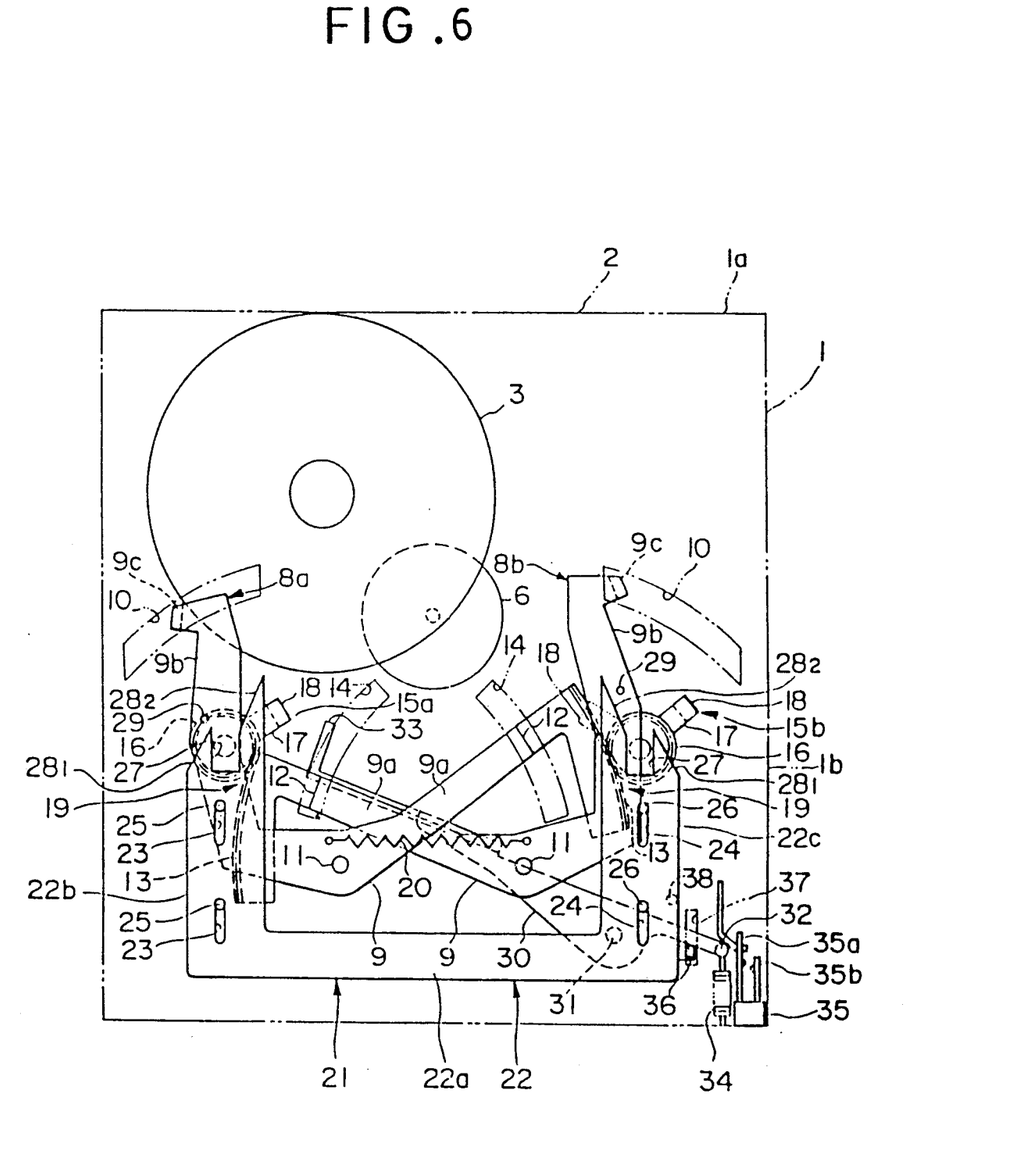

When the disk type record medium 3 is completely introduced into the inner portion of the body 1 and the pressing of the disk type record medium 3 is finished as shown in FIG. 6, the left side record medium size detecting member 8a rotates clockwise in the Figure by the resilient force of the spring 20. According to the rotation of the member 8a, the right side stopper 15b rotates counterclockwise in the Figure.

With the clockwise rotation of the left side record medium size detecting member 8a, the disk type record medium 3 of which outer circumference contacts the projecting wall 9c is biased and moved toward the record medium lodging position center O. The outer circumference of the medium 3 contacts the contacting portion 33 of the trigger 30 (See FIG. 7).

Figure 7:
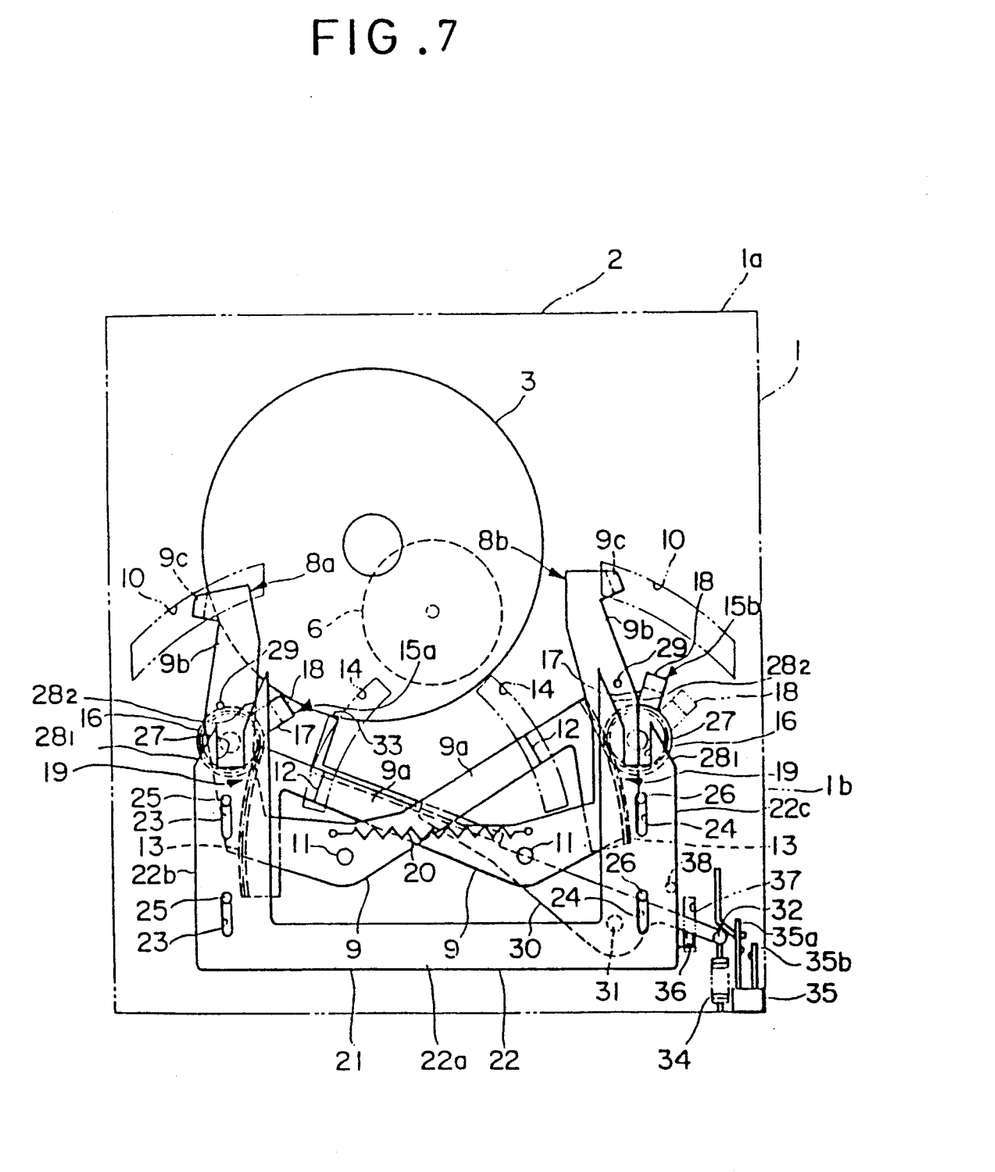
Figure 8:
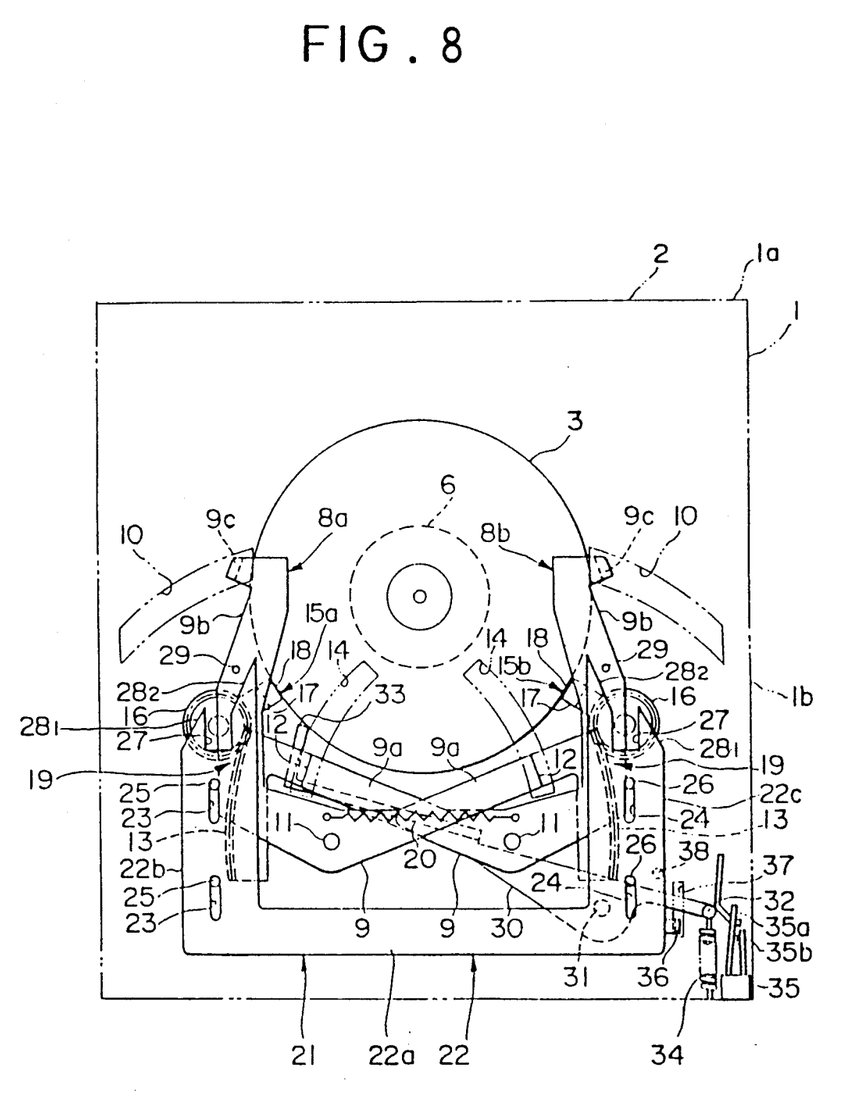

From the state of FIG. 7, the left side record medium size detecting member 8a rotates clockwise again by the resilient force of the spring 20 and returns to the initial state (the state of FIG. 1), and accordingly the right side stopper 15b also returns to the initial state (the state of FIG. 1). As the outer circumference of the disk type record medium 3 contacts both stoppers 15a and 15b, the center of the disk type record medium 3 is maintained in alignment with the record medium lodging position center O. At the same time, the trigger 30, of which contacting portion 33 contacts the outer circumference of the disk type record medium 3, rotates counterclockwise by stretching the spring 34 so as to turn the switch 35 ON, thereby the reproduction preparing apparatus operates to start reproduction (See FIG. 8).

Figure 9:
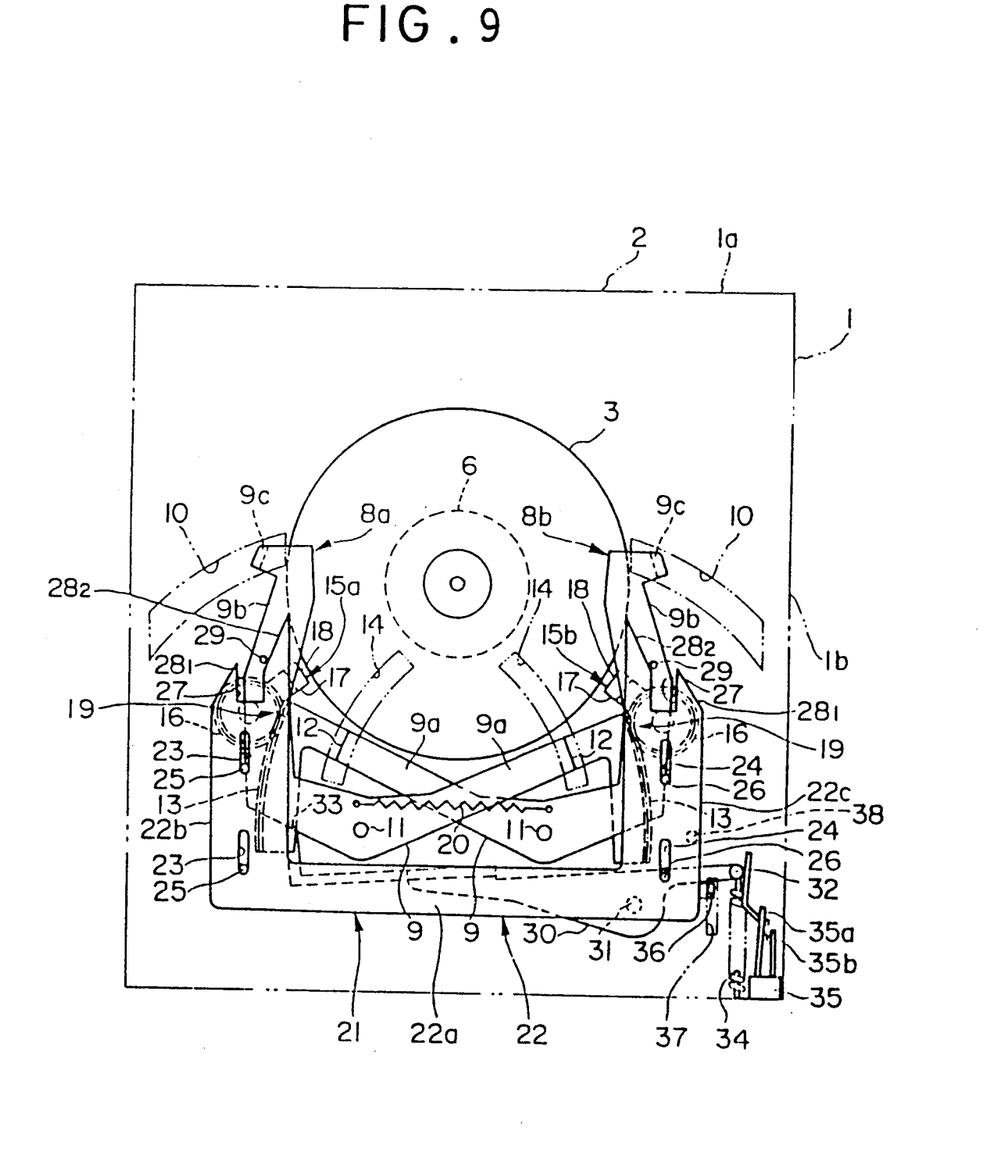

By the completion of the reproduction preparing operation as previously described, the body 22 of the separating unit 21 moves upwardly. As the second slopes 28₂ of side plates 22b and 22c contact the pins 29 of detecting members 8a and 8b, the projecting walls 9c of detecting members 8a and 8b are separated from the outer circumference of the disk type record medium 3 against the resilient force of the spring 20. The upward movement of the body 22 of the separating unit 21 causes the first stopper 36 mounted thereon to contact the trigger 30. The trigger 30 rotates counterclockwise in the Figures so that the contacting portion 33 is separated from the outer circumference of the disk type record medium 3. Under the condition that the center of the disk type record medium 3 is aligned with the record medium lodging position center O, the clamper 39 presses the turntable 6 so that the disk type record medium 3 is integrally rotated with the turntable 6 so as to make reproduction (See FIG. 9).

As mentioned above, the invention resides in a disk type record medium lodging apparatus having a pair of linkages in which the right side record medium size detecting member is coupled with the left side stopper and the left side record medium size detecting member is coupled with the right side stopper, and a separating unit which separates each pair of the record medium size detecting member and the stopper from the disk type record medium according to a given reproduction preparing operation, wherein the position relation between a record medium size detecting member and the same side stopper is defined such that a distance perpendicular to the introducing direction of two kinds of the record medium is shorter that the radius of the disk type record medium having the smallest radius under the conditions that the record medium size detecting member is positioned the farthest away from the record medium lodging position center and the stopper is positioned the nearest to the record medium lodging position center.

Therefore, the introducing position of the disk type record medium having a small outer through the slit entrance is not limited, and the exactness in aligning the centers between the turntable and the disk type record medium having a small outer diameter is improved with a simple construction.

What is claimed is:

1. A disk type record medium lodging apparatus including:
   a body having a top and a bottom, right and left sides and a slit entrance in the top extending from right to left and defining a plane of introduction for uprightly introducing disk type record media having different diameters into said apparatus;
   two record medium size detecting members mounted respectively on the left and right sides of said body, each of which is movable a variable distance in said plane of introduction from a given record medium lodging position center in a given range, and is biased toward said record medium lodging position center;
   two stoppers mounted respectively on the left and right sides of said body, each of which is positioned below said record medium size detecting members and said record medium lodging position center, said stoppers being movable a variable distance in said plane of introduction from said record medium lodging position center in a given range in accordance with the movement of the size detecting members, and said stoppers regulating a said disk type record medium having the smallest of said diameters to be exactly positioned on a given record medium lodging position center when positioned nearest to said record medium lodging position center;
   a pair of gearing mechanisms by which the right side record medium size detecting member is coupled with the left side stopper and the left side record medium size detecting member is coupled with the right side stopper;
   and a separating unit which separates each of the record medium size detecting members and the stoppers from the disk type record medium according to a given reproduction preparing operation, wherein the position relations between the record medium size detecting member on one side and the stopper on the same side are defined such that the distance therebetween which is perpendicular to the introducing direction of the record media is shorter than the radius of the disk type record medium having the smallest radius when the record medium size detecting member is positioned farthest away from the record medium lodging position center and said stopper is positioned nearest to said record medium lodging position center.

2. A disk type record medium lodging apparatus including:
   a body having a top and a bottom, right and left sides and a slit entrance in the top extending from right to left and defining a plane of introduction for uprightly introducing disk type record media having different diameters into said apparatus;
   two record medium size detecting members mounted respectively on the left and right sides of said body, each of which is movable a variable distance in said plane of introduction from a given record medium lodging position center in a given range, and is biased toward said record medium lodging position center;
   two small disk stoppers mounted respectively on the left and right sides of said body, each of which is positioned below said record medium size detecting members and said record medium lodging position center, said small disk stoppers being movable a variable distance in said plane of introduction from said record medium lodging position center in a given range in accordance with the movement of the size detecting members, and said small disk stoppers regulating a said disk type record medium having the smallest of said diameters to be exactly positioned on a given record medium lodging position center when positioned nearest to said record medium lodging position center;
   a pair of gearing mechanisms by which the right side record medium size detecting member is coupled with the left side small disk stopper and the left side record medium size detecting member is coupled with the right side small disk stopper;
   a large disk stopper for stopping further insertion of a said disk type record medium having the largest of said diameters below a depth at which said largest diameter disk is positioned over said record medium lodging position center;
   and a separating unit which separates each of the record medium size detecting members, the small disk stoppers and the large disk stopper from the disk type record medium according to a given reproduction preparing operation,
wherein the position relations between the record medium size detecting member on one side and the small disk stopper on the same side are defined such that the distance therebetween which is perpendicular to the introducing direction of the record media is shorter than the radius of the disk type record medium having the smallest radius when the record medium size detecting member is positioned farthest away from the record medium lodging position center and said small disk stopper is positioned nearest to said record medium lodging position center.

3. A disk type record medium lodging apparatus as in claim 2 wherein said large disk stopper is a pivotable trigger for activating said reproduction preparing operation, said trigger being pivotatably moved by a disk inserted into the apparatus and having a maximum downward deflection corresponding to the depth at which, when said largest diameter disk is inserted, it is positioned over said record medium lodging position center.

* * * * *